United States Patent
Konuma

(10) Patent No.: US 8,271,904 B2
(45) Date of Patent: Sep. 18, 2012

(54) IMAGE FORMING APPARATUS

(75) Inventor: Shigeo Konuma, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 816 days.

(21) Appl. No.: 11/868,230

(22) Filed: Oct. 5, 2007

(65) Prior Publication Data

US 2008/0250353 A1   Oct. 9, 2008

(30) Foreign Application Priority Data

Apr. 6, 2007   (JP) ................. 2007-100728

(51) Int. Cl.
*G06F 3/048* (2006.01)

(52) U.S. Cl. ........ 715/840; 715/764; 715/810; 715/274; 715/745

(58) Field of Classification Search ............ 715/764, 715/810, 840
See application file for complete search history.

(56) References Cited

U.S. PATENT DOCUMENTS

| | | | | |
|---|---|---|---|---|
| 5,669,040 A | * | 9/1997 | Hisatake | 399/83 |
| 6,687,018 B1 | * | 2/2004 | Leong et al. | 358/1.15 |
| 7,258,498 B2 | * | 8/2007 | Hatta et al. | 400/62 |
| 2006/0055968 A1 | * | 3/2006 | Sato et al. | 358/1.15 |

FOREIGN PATENT DOCUMENTS

| | | |
|---|---|---|
| JP | 8-307583 | 11/1996 |
| JP | 2006-26992 | 2/2006 |

* cited by examiner

*Primary Examiner* — Robert Stevens
*Assistant Examiner* — Sherrod Keaton
(74) *Attorney, Agent, or Firm* — Finnegan, Henderson, Farabow, Garrett & Dunner, L.L.P.

(57) ABSTRACT

An image forming apparatus which executes jobs to form images, including: a job memory section which stores job information indicating setting contents of the jobs; a display section having a first region and a second region that never overlap; and a control section which controls contents to be displayed, wherein the control section controls to display a job list in the first region based on the job information, and also display a setting content of a job selected from the job list in the second region, while a function of an operation button is given to the setting content, wherein when the operation button is selected, by utilizing the setting content corresponding to the selected operation button as a search key, a job is extracted from the job list and displayed such that the extracted job and the other job can be distinguished.

7 Claims, 8 Drawing Sheets

IMAGE FORMING APPARATUS

CROSS REFERENCE TO RELATED APPLICATION

The present application is based on Japanese Patent Application No. 2007-100728 filed with Japanese Patent Office on Apr. 6, 2007, the entire content of which is hereby incorporated by reference.

BACKGROUND OF THE INVENTION

1. Field of Technology

This invention relates to an image forming apparatus that is capable of displaying a job list.

2. Description of the Related Art

In some image forming apparatuses such as copiers or the like, the next job can be input as a reserved job before output of the previous job is complete and thus they include a so-called reserve function. Some of image forming apparatuses which include the reserve function have a function which displays the job numbers and status, the number of sheets to be printed, the required time and the like for the jobs that are on standby for output as the job list 501 on the job manager screen 500, as shown in FIG. 8. The job list 501 is used by the user to check the status of jobs that are on standby for output, select a job from the job list 501 and suspend it, delete it or to change the priority order as necessary.

In order to perform this type of determination accurately, just the information displayed on the job list is sometimes insufficient. Then, there are image forming apparatuses in which a details button 502a is provided in the job manager screen 500, and when the details button 502a is operated, detailed information for the job selected at that time is displayed by transferring to a different screen, or displayed on a different screen having popped up. (For example, see Unexamined Japanese Patent Application Publication No. H8-307583).

Generally, the reserved jobs are normally executed in the order in which they are input, and in the case where there is no size or type of the paper that is set when the reserve job was input in the paper feeding tray when the job is being executed, the operations are usually conducted where the job is temporarily stopped, a warning is displayed and the apparatus waits until the user loads the specified paper. For this reason, in the case where there are many reserved jobs, if the jobs are executed in the order of input, it is sometimes necessary to frequently change the paper in the feeding tray. In these cases, the workload on the user increases and there is also a great reduction in work efficiency of the image forming apparatus due to the discontinuation of the output operation for the exchange operations.

In this case, the job, for which there is none of the paper that is specified as the output paper loaded in the paper feeding tray, may be selected from the job list and switched to the suspend status, but when a large number of jobs are registered on the job list, the workload becomes large for finding the relevant jobs and switching them to the suspend state. Thus, an image reading apparatus has been proposed which includes a function of extracting the jobs having the same specified output paper as that of the specified job, from the job list, and these jobs are transferred to the suspend state together (See Unexamined Japanese Patent Application Publication No. 2006-26992 for example).

In the image forming apparatus, there are often restrictions on the size of the display screen due to factors such as device cost and panel arrangement and the like, and thus it is difficult to significantly increase the information for each job displayed on the job list. In addition, in the configuration in which the detailed information for the job selected from the job list is transferred to a separate screen and displayed there, each time when the displayed information is checked, an operation for displaying on the separate screen as well as operation for returning to the original screen after checking is completed are necessary and there is a problem in that these operations are complex and cannot be performed quickly. Furthermore, the detailed information for the job selected in the job list and the job list cannot be viewed simultaneously, which was inconvenient.

In addition, the function of extracting the jobs having the same specified output paper as that of the specified job, from the job list, and transferring together these jobs to the suspend state is convenient, but there are restrictions in that the job cannot be extracted under arbitrarily selected conditions and the extracted job is merely transferred to the suspend state.

This invention was conceived in an attempt to solve the above problems and the first object of this invention is to provide an image forming apparatus that is capable of extracting the jobs having the same setting content as that of the specified job, and displaying the extracted jobs, while the second object is to provide an image forming apparatus which is capable of performing a batch operation for the extracted jobs.

SUMMARY OF THE INVENTION

One aspect of the invention for achieving the above objects is an image forming apparatus which executes jobs to form images, including: a job memory section which stores job information indicating setting contents of the jobs; a display section which has a first region and a second region in a screen, the first and the second regions never overlapping with each other; and a control section which controls contents to be displayed on the display section, wherein, the control section controls to display a job list in the first region based on the job information stored in the job memory section, and also in parallel with displaying the job list, display a setting content of a job selected from the job list by each setting item in the second region, while a function of an operation button is given to the setting content displayed, wherein in cases where the operation button is selected, by utilizing the setting content corresponding to the selected operation button as a search key, a job is extracted from the job list and the job list is displayed in such a configuration that the extracted job and the other job can be distinguished.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

The following is a description of an embodiment of this invention with reference to the drawings.

Figure 1:
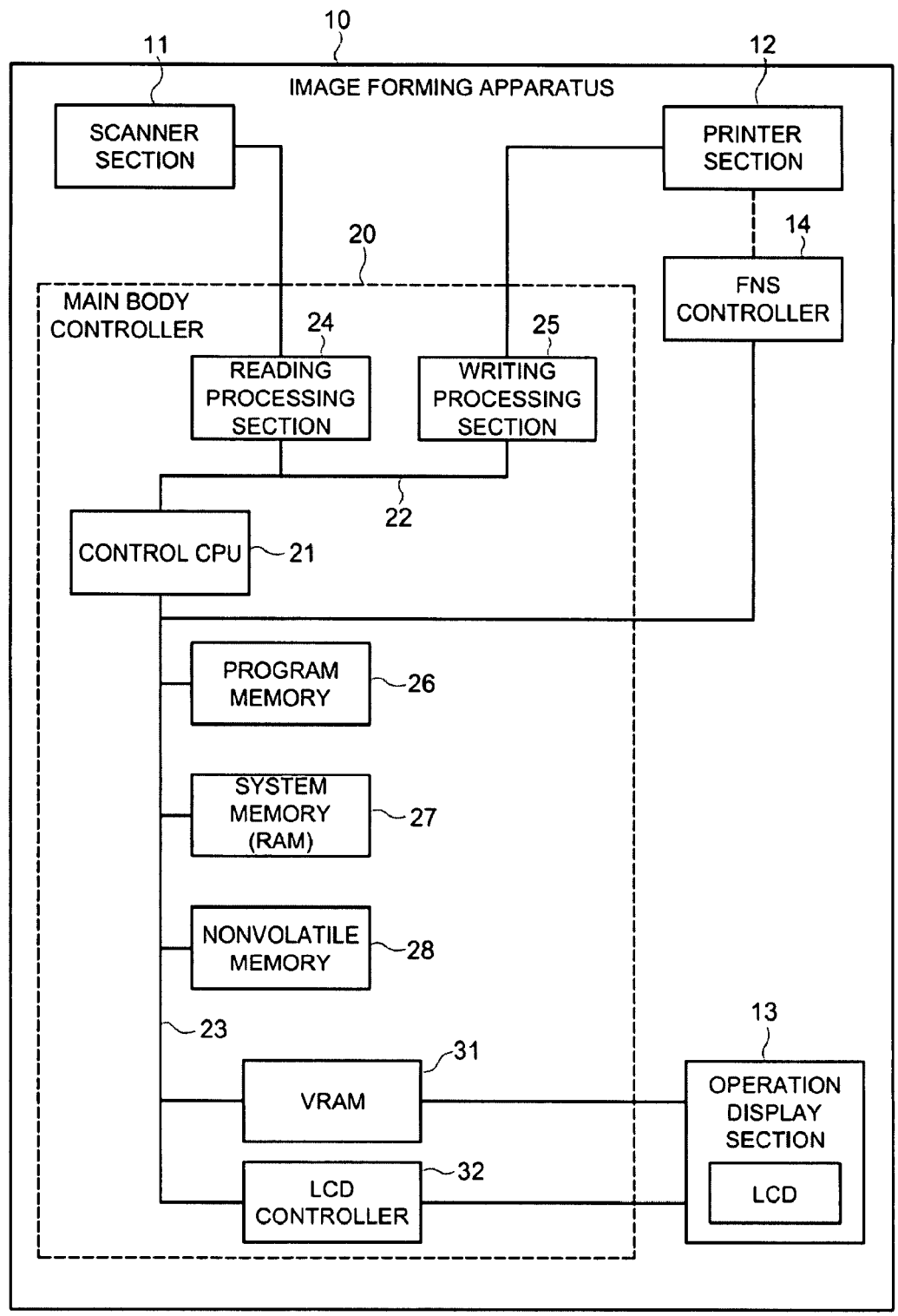
FIG. 1 is a block diagram showing the structure of the image forming apparatus according to an embodiment of this invention.

FIG. 1 shows a schematic drawing of the image forming apparatus 10 according to an embodiment of this invention. The image forming apparatus 10 is a multi function peripheral that has a copy function which optically reads a document and prints the obtained image on a recording medium and then outputs it; a scanning function which outputs the image data that was obtained by optically reading a document to an external device; a saving function which saves the image data; and a printer function and the like.

The image forming apparatus 10 comprises a scanner section 11; a printer section 12; an operation and display section 13 which controls user interface; and a FNS controller 14 which are all connected to the main body controller 20. A post processing section (not shown) which performs post processing such as folding, binding, and hole punching of the recording paper discharged from the printer section 12 is connected to the subsequent part of the printer section 12 and the FNS controller 14 controls this post processing.

The scanner 11 performs the function of reading the image data by optically reading the document. The scanner section 11 includes: a light source for exposing the document; a line image sensor which read one line portions of the document in the width direction thereof; a moving means for moving the reading position of the line unit in the length direction of the document; and an optical system comprising lens and a mirror which lead reflected light from the document to the line image sensor and focuses the light.

The printer section 12 performs the function of printing the image corresponding to the image data on recording paper. The printer 12 herein forms images by electrophotographic processing and is a so-called laser printing including: a recording paper conveyance device; a photoreceptor drum; a charging device; a laser unit; a developing device; a transfer separation device; a cleaning device; and a fixing device.

The operation display section 13 comprises a liquid crystal display (LCD) as the display section which has a touch panel on its surface and an operation switches such as the start button and the like. The operation display section 13 displays various operation screens and information screens and accepts various operations performed by the user. The image forming apparatus 10 accepts various setting operations related to the jobs and job entry operations from the user via the operation display section 13. Examples of the jobs include copy jobs for copying documents and print jobs for printing based on print data.

The main body controller 20 comprises a central processing unit (CPU) 21 as the controller which performs overall control of the operations of the image forming apparatus 10. Image bus 22 and system bus 23 which are independent from each other are connected to the control CPU 21.

The image bus 22 has the reading processing section 24 and the writing processing section 25 connected thereto. The reading processing section 24 is a circuit which performs image processing such as shading correction/brightness density conversion, density γ conversion and error dispersion and the like, successively for image data input from scanner 11. The writing processing section 25 is a circuit which performs image processing such as cell equalizing, resolution conversion, printer γ conversion, micro-magnification, screen processing and the like for image data output to the print section 12.

The system bus 23 connects the program memory 26, the system memory 27, the non-volatile memory 28, VRAM 31 which is the display memory and the LCD controller 32. The program memory 26 stores the programs which the control CPU 21 executes. The system memory 27 is used as a work memory or an image memory for temporarily storing various data when the control CPU 21 executes programs.

The non-volatile memory 28 stores user information such as user name or password, job information which indicates attributes of the job such as job setting information and owner, as well as various information to be stored when power is turned off (counters which show use level and the like).

VRAM (video random access memory) 31 is memory for storing image data displayed on the liquid crystal display (LCD) of the operation display section 13. The LCD controller 32 performs control for displaying images on the liquid crystal display (LCD) of the operation display section 13 based on the data stored in the VRAM 31.

Figure 2:
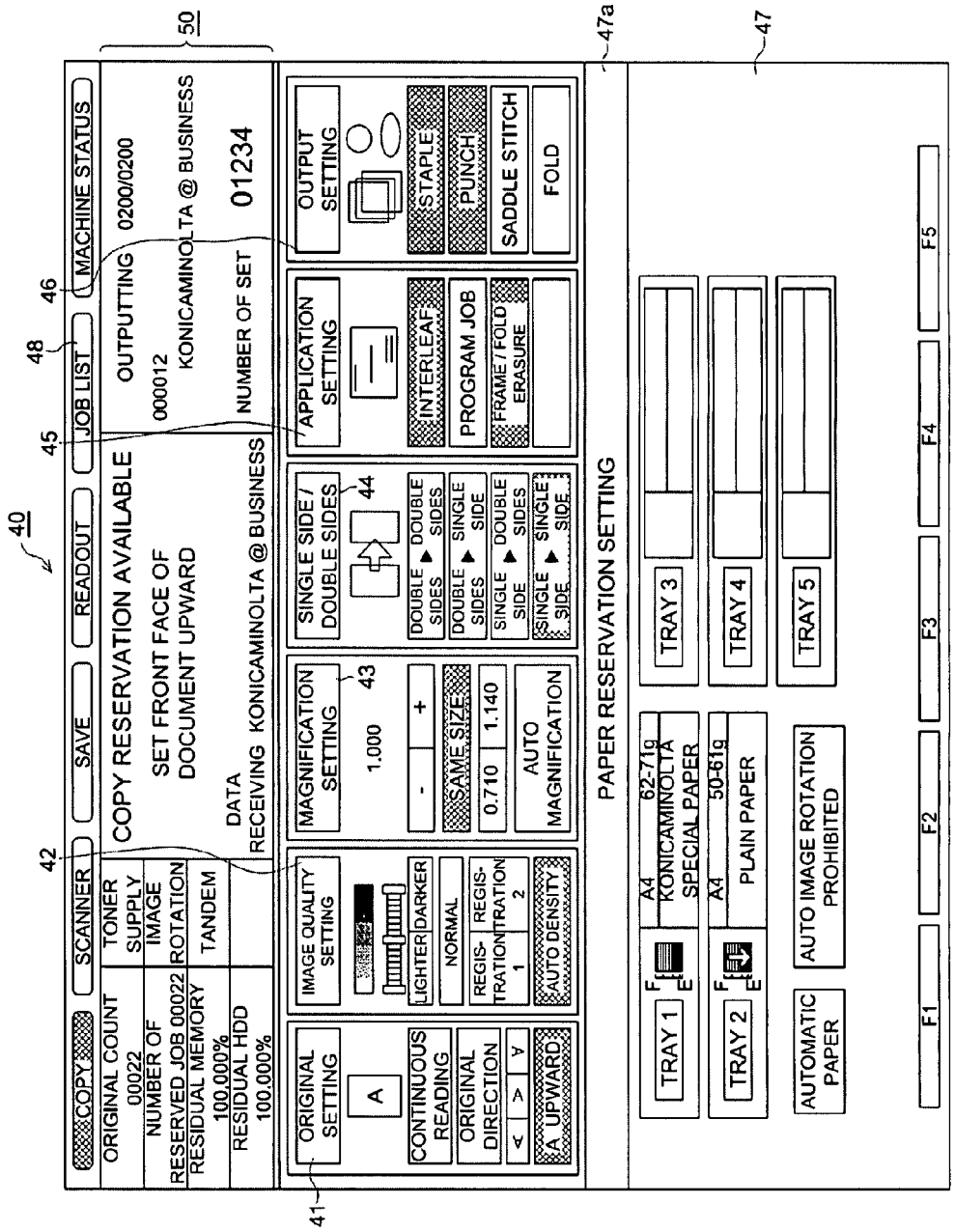
FIG. 2 is an explanatory diagram showing one example of the copy setting screen which is displayed in the operation display section of the image forming apparatus according to an embodiment of this invention.

FIG. 2 is an explanatory diagram showing one example of the copy setting screen 40 in which various settings related to the copy job are performed. The upper portion of copy setting screen 40 has a basic information display section 50 for displaying basic items relating to the current state of the image forming apparatus 10. Setting columns which include document setting 41, image quality setting 42, magnification setting 43, single side/double side setting 44, applications setting 45, output setting 46, and paper setting 47 are provided below the basic information display section 50 on the copy setting screen 40. These setting columns 41-47 display setting information and operation buttons as well as the current setting content for each item for setting.

For example, the document setting is the setting relating to the method for reading the document (continuous or single sheet) or to the direction of the document that is set at the scanner section 11. In the example in FIG. 2, the method for reading the document is "continuous reading" and the document direction is set to "upward". In the application setting the interleaf function and the frame/fold erasure function are set to on. The interleaf function is the function for inserting at the post processing device, a separate sheet between one recording sheet and another recording sheet that have been output from the printer section 12. The frame/fold erasure function replaces image data with white data at the peripheral edge portion or the folding portions for two folds or the like of the read document and erases unneeded images such as shadows and the like.

In the output setting, the function for binding the recording sheets output from the printer section 12 with staples and function for punching holes are set to be on. In the paper setting, the setting is such that the recording sheets used in the copy job are fed from tray 1. In addition, the size and type, the basis weight and the remaining weight and the like of the sheets set in each tray are displayed in the setting column for paper setting. It is to be noted that when the sheet reservation setting button 47a is operated, the state where a suitably selected sheet, which is different from the sheet currently set, can be virtually set and the sheet feeding tray can be selected at the time of output.

The setting content for each of the items for setting that are set in the copy setting screen 40 and the like is a portion of the job information for the job and is stored in the non-volatile memory 28. It is to be noted that the job information includes information such as the user name of the user who input that job, the mode indicating the job type (print, copy etc.), the file name of the print data to be printed in the case of a print job, job status (being output, reserved, suspended etc.), number of copies to be printed, number of sets to be printed, number of sheets remaining to end of printing, and required time when performing a job.

In the image forming device 10, the next job can be input as a reserved job before execution of the job that was previously input is complete. The copy operation is conducted as a combination of the input operation in which image data obtained by reading the document using the scanner section 11 is temporarily stored in memory and the output operation in which image data is read from this memory and output from the printer section 12. For this reason, if the input operation is complete and the scanner section 11 is in an empty state, while the output operation for this job is being performed by the printer section 12, a reserve job can be input by reading the document for the next job by the scanner section 11 and storing it in the memory. For example, in the case where multiple sets (for example 100 sets) are to be copied, it is possible to input many reserved jobs during the output operation for this job.

In addition, in the case of a print job, while the output operation for another job is being performed, new print jobs can be received one after the other as reserved jobs from external terminals such as personal computers and the like.

The image forming apparatus 10 may create a job queue in which the jobs for which output operation is incomplete from among the jobs that have been input are arranged in order of output priority and stored in the non-volatile memory 28 and job output operation is performed from the top of the job queue. It is to be noted that the jobs registered in the job queue and the job information for the job are linked. The control CPU 21 displays the job list and job setting content described hereinafter based on the job queue and the job information stored in the non-volatile memory 28.

Next, the job list display will be described.

Figure 3:
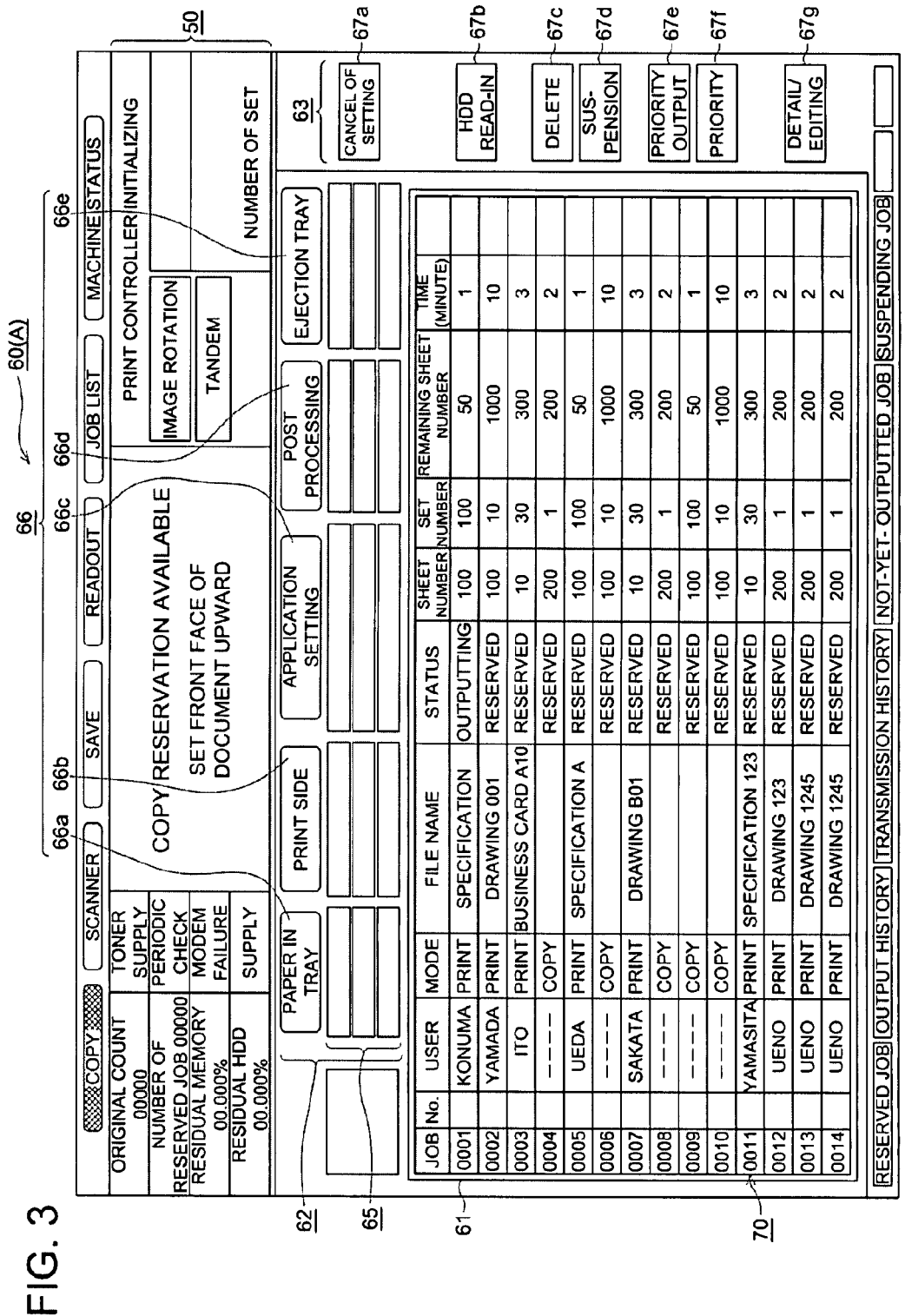
FIG. 3 is an explanatory diagram showing an example of the job list screen at the time when no job is selected, which is displayed in the operation display section of the image forming apparatus according to an embodiment of this invention.
Figure 4:
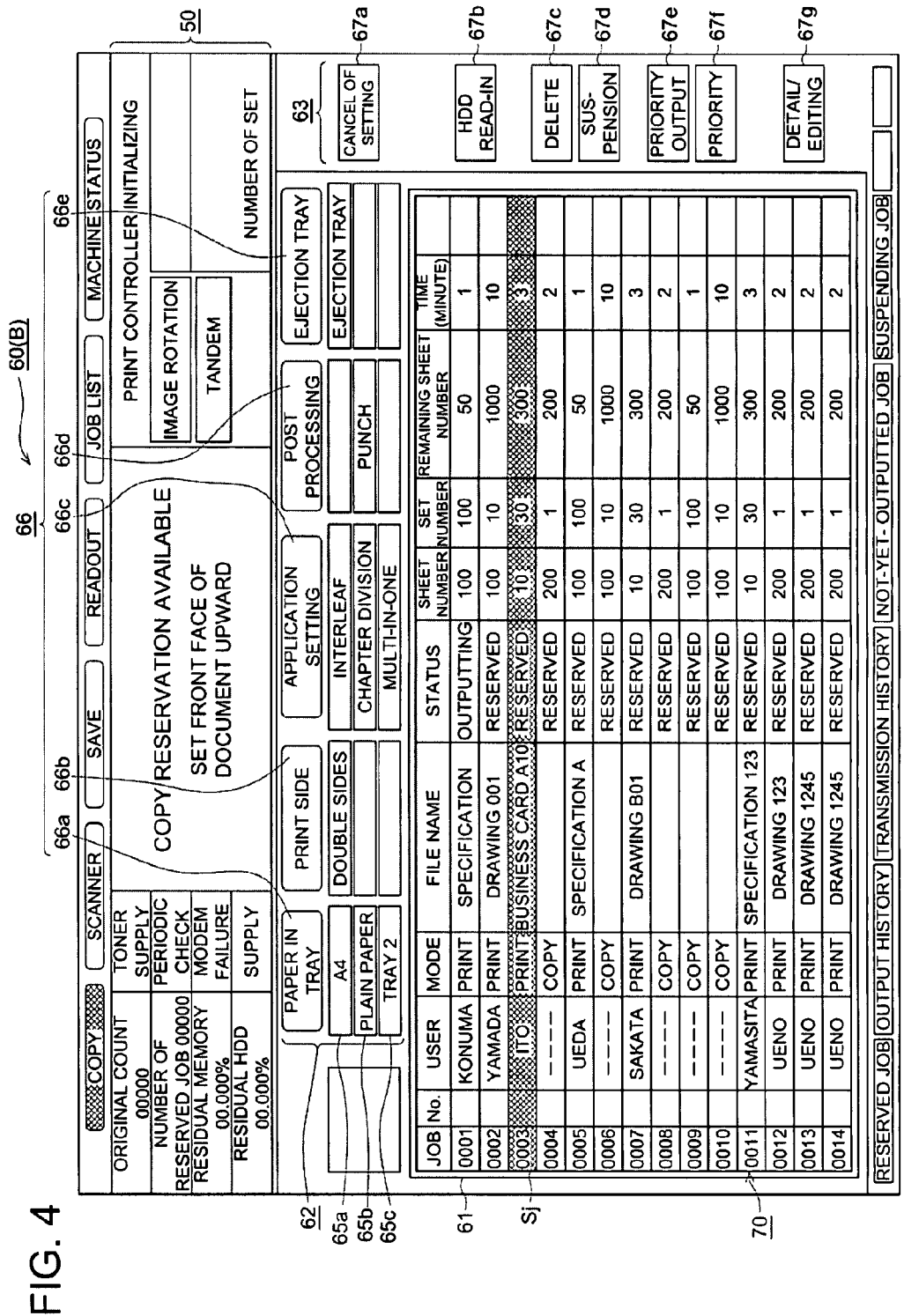
FIG. 4 is an explanatory diagram showing an example of the job list screen at the time of job selection which is displayed in the operation display section of the image forming apparatus according to an embodiment of this invention.

FIG. 3 and FIG. 4 show the job list screen 60 which is displayed in the operation display section 13. The job list screen 60 is displayed when the user selects the job list tag 48 which is at the upper right side of the copy setting screen 40 shown in FIG. 2. It is to be noted that in the image forming apparatus 10, when the user touches the operation buttons using a finger displayed on the various screens in the operation screen section 13, the operation or selection for the location or the operation button is accepted.

The basic information display section 50 is set in the same manner as the copy setting screen 40 at the upper portion of the job list screen 60. The job list screen 60 comprises; a first region 61 in which the job list 70 is displayed; a second region 62 in which the setting content for the jobs (selected jobs Sj) selected by the user from the job list is displayed by item for setting; and a third region 63 in which the various operation buttons are lined up, and these are separate regions that do not overlap with each other.

The job list screen 60 (A) of FIG. 3 shows the state where no job has been selected by the user from the job list 70 shown in the first region 61 (no selection state), while FIG. 4 shows job list screen 60 (B) in the state where one job has been selected by the user from the job list 70 shown (selection state).

The job list 70 displayed in the first region 61 includes information indicating job number, the user name of the user who input that job, the mode indicating the job type, the file name of the print data to be printed in the case of a print job, current job status (being output, reserved, suspended etc.), number of copies to be printed, number of sets to be printed, number of sheets remaining to end of printing, and required time when performing a job and these are displayed by listing in a horizontal line for each job.

As shown in FIG. 4, the second region 62 has a plurality of display operation buttons 65 which display setting content for selected job Sj that has been selected from the job list 70 displayed in the first region 61 and which also have the respective operation button functions. These display operation buttons 65 are classified into a plurality of groups and displayed along with the respective titles 66 of the groups.

In job list screen 60 (B) of FIG. 4, the setting item group for tray/paper; the setting item group for printing surface, the setting item group for application setting; the setting item group for post processing, and the setting item group for paper ejection tray are displayed. These group titles 66a-66e are displayed in a horizontal line at the upper portion of the second region 62, and below each title, display operation buttons 65 for the setting items in the group shown by that titles are arranged.

For example, in the job list screen 60(B) of FIG. 4, the display operation buttons 65 in this group which are under title 66a for "tray/paper" are the paper size button 65a which indicate output paper size; paper type button 65b which indicates type of output paper; and tray button 65c which indicates paper feeding tray number for the output paper and these are displayed vertically. In this example, "A4" is displayed at the paper size button 65a, and this indicates that paper size has been set to "A4". "Plain paper" is displayed at the paper type button 65b and this indicates that the paper type has been set to "plain paper". "Tray 2" is displayed at the tray button 65c and this indicates that the paper feeding tray has been set to "Tray 2".

As shown in FIG. 3, in the state where no job has been selected, the display operation buttons 65 in the second region 62 are not displayed. If the user selects one job from the job list 70 that is displayed in the first region 61, as shown in FIG. 4, the display operation buttons 65 which show the setting content for each of the items for setting of the job that was selected (selected job Sj) are displayed in the second region 62. Also, in the job list 70 display, the one horizontal line corresponding to the selected job Sj is displayed in a manner that is different from that of the other jobs, such as inverse display. FIG. 4 shows job No. 0003 which is job Sj in a state in which it has been selected by the user, and the job No. 0003 line is displayed so as to be distinguishable within the job list 70 and the setting content of the job is displayed in the second region 62.

It is to be noted that if the user touches the location corresponding to the job list 70 using a finger, the job displayed at that location will be selected. In addition, when a job has been selected, if the user touches the location corresponding to the job list 70 using a finger, the corresponding job will be newly selected, and the display content in the second region 62 will be switched so as to correspond to the setting content of the newly selected job.

Operation buttons 67 which include the setting cancel button 67a, the HDD read-in button 67b, the delete button 67c, the suspension button 67d, the priority output button 67e, the priority button 67f, the detail/edit button 67g are arranged in a line in the third region 63.

The control CPU 21 performs the processes corresponding to the operation button 67 for the currently selected job when any of the operation buttons 67 are operated in the state where a job has been selected.

More specifically, when the setting cancel button 67a is operated, the control CPU 21 cancels all the current settings for the job for which the setting content is displayed in the second region 62 and the settings are changed to the default value. Also, when the delete button 67c is operated, the currently selected job is deleted.

If the suspend button 67d is operated, the status of the currently selected job is changed to the suspend status. The method for putting the job in the suspend status may, for example be one in which the job status information is changed to suspend for that job while the job remains in the job queue. In this case, when the control CPU 21 searches for the next job to be executed from the top of the queue, it skips the jobs whose status information is suspend. Alternatively, the job that is suspended may be temporarily removed from the job queue.

When the priority output button 67e is operated, the control CPU 21 moves the currently selected job to the highest priority order. Also, if the priority button 67f is operated, it becomes possible to suitably change the priority level of the currently selected job and a state in which that operation is accepted will be achieved. Priority level change is performed in the job queue by changing the order of the jobs.

When the details/edit button 67g is operated, the control CPU 21 displays the screen (not shown) for changing the various setting content for that job as a pop-up screen. For example an operation screen may be displayed in which the same setting changes as the copy setting screen 40 shown in FIG. 2 are possible.

If the display operation button 65j in the second region 62 is selected when in a state in which the setting content of the selected job Sj that was directly selected from the job list 70 by the user is displayed in the second region 62, the image forming device 10 searches for and extracts from the job list 70, the job in which the same setting content indicated by the selected display operation button 65 and the items thereof is set, and the extracted job (extracted job Rj) is displayed in the job list 70 in a form that is distinguishable from the other jobs.

Figure 5:
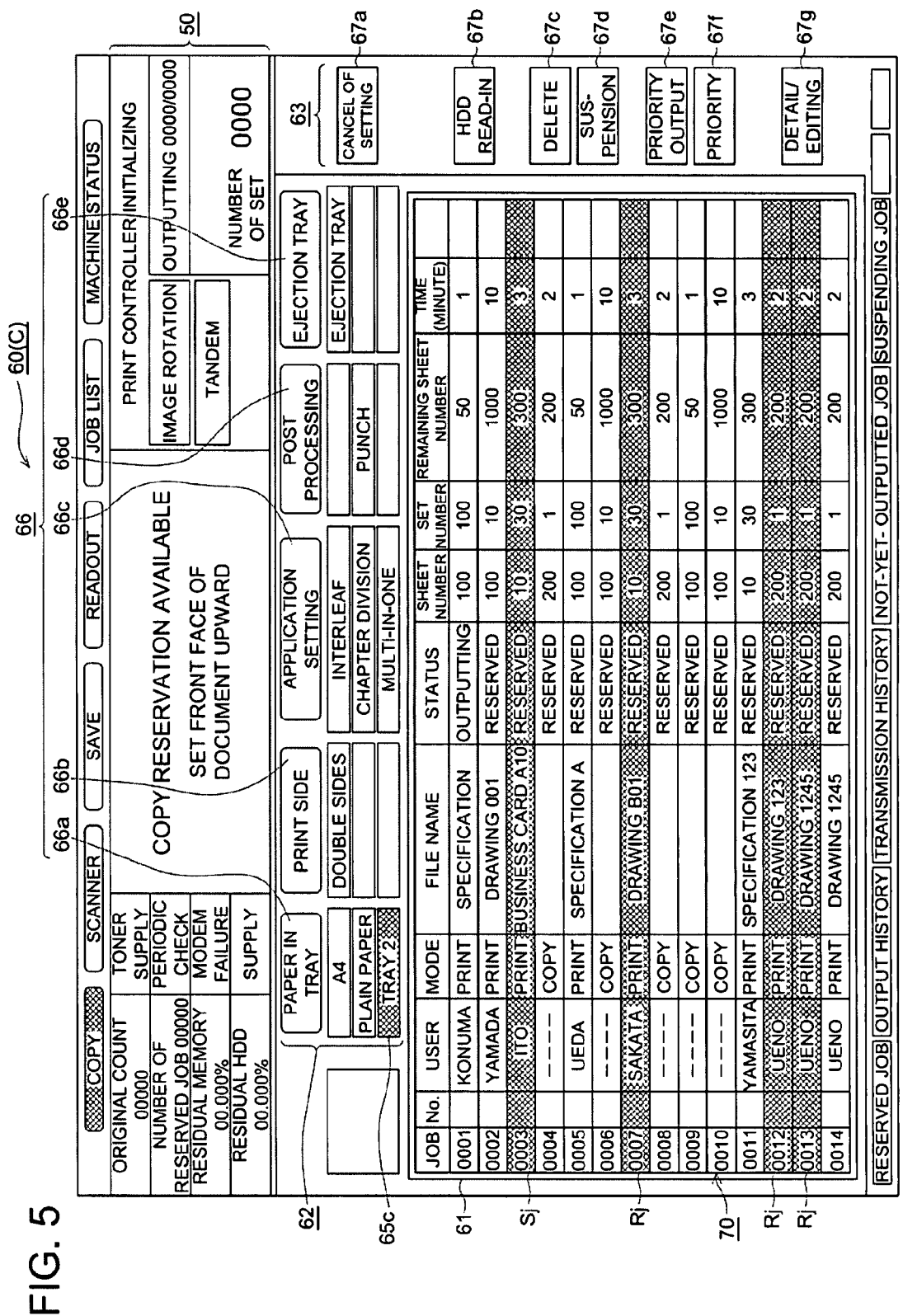
FIG. 5 is an explanatory diagram showing the display state when a tray button is selected in the job list screen shown in FIG. 4.

For example, FIG. 5 shows the job list screen 60 (C) in the case where the tray button 65C has been selected in the job list screen 60(B) which is shown as an example in FIG. 4. In this example, "tray 2" is displayed at the tray button 65c, and thus the job is one in which the paper feeding tray for output paper is set to tray 2 and job Rj other than the selected jobs Sj is extracted from the job list 70 and displayed in a manner that is distinguishable from the other jobs.

Here, in order to distinguish between the selected jobs Sj, the retrieved jobs Rj and the other jobs, they are displayed in different forms from each other. In the example in FIG. 5, three extracted jobs Rj with job numbers 0007, 0012 and 0013 are extracted, and each row corresponding to these extracted jobs Rj are displayed in a different form from the rows of the other jobs.

It is to be noted that the display operation button 65 can make multiple selections, and in the case of multiple selections, job extraction is performed by subjecting the setting content to AND conditions. That is to say, jobs having the same setting content for all the setting items as the setting content corresponding to the multiple display operation buttons 65 that have been selected for setting are extracted and displayed so as to be distinguishable. As a result, the candidate jobs can be easily narrowed down to the target job by using multiple conditions. The operation for multiple selections of the display operation buttons 65 can be performed by operating the display operation buttons 65 one after the other. Also, by operating the selected display operation button 65 again, the selection of the display operation button 65 can be cancelled.

When the job is extracted, if any of the operation buttons 67 that are arranged in the third region 63 is operated, the control CPU 21 performs the process (operation) corresponding to that display operation button 67 collectively for all of the extracted jobs Rj or the extracted jobs Rj and the selected jobs Sj. For example, if the delete button 67c is operated, the selected job Sj and the extracted jobs Rj are all deleted and if the save button 67d is operated, the selected job Sj and the extracted jobs Rj are all put in the suspend status. In addition, in the case where the priority output button 67e is operated, the process of changing the priority order of the extracted jobs Rj is performed, and as shown in the job list screen 60 (D) in FIG. 6, the extracted jobs Rj are reserved continuously after the selected jobs Sj.

It is to be noted that the extracted jobs Rj can be individually removed from those subjected to collective processing above. Here, by selecting the display location of the extracted job Rj in the job list 70, those extracted jobs Rj may be removed from those to be subjected to collective processing. By re-selecting the display location, it may be returned to the state for subjection to collective processing. The extracted jobs Rj that are removed from those for collective processing are displayed so as to be distinguishable from the extracted jobs Rj which are for collective processing. For example, the extracted jobs Rj that are removed from those for collective processing may be displayed so as to be grayed out.

Figure 7:
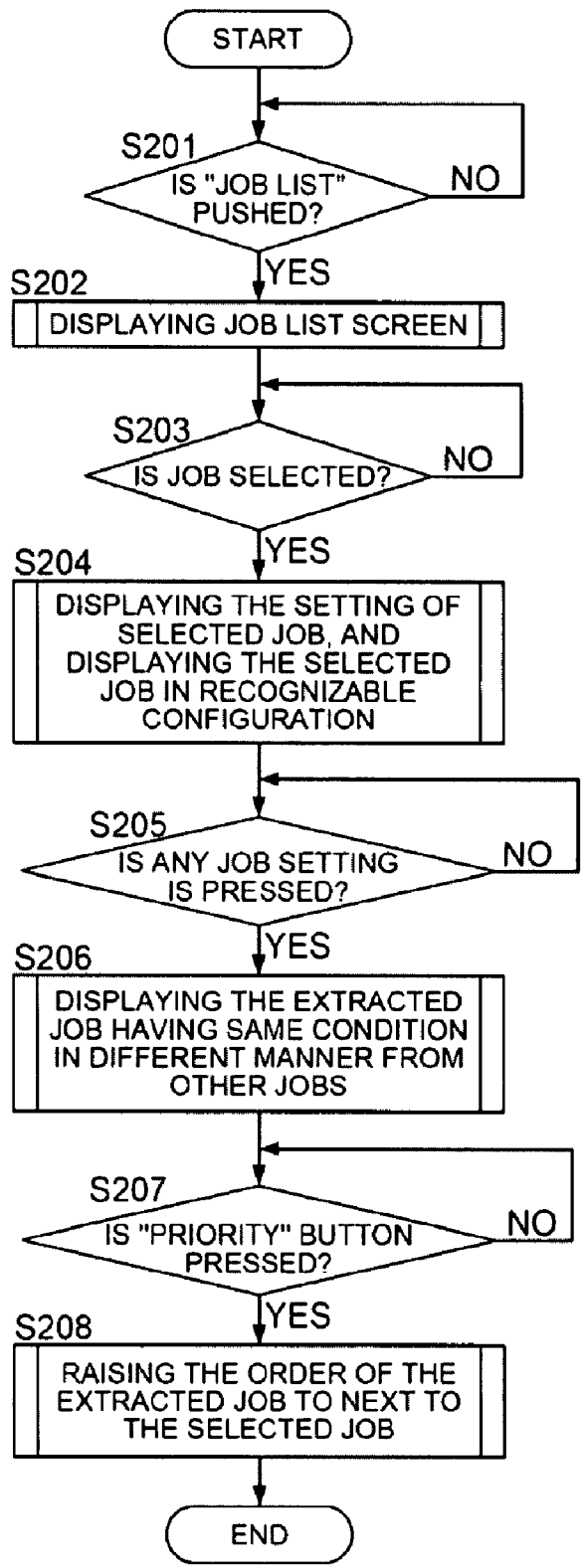
FIG. 7 is a flowchart showing the flow of the processes performed by the control CPU that are related to the job list screen display.
Figure 8:
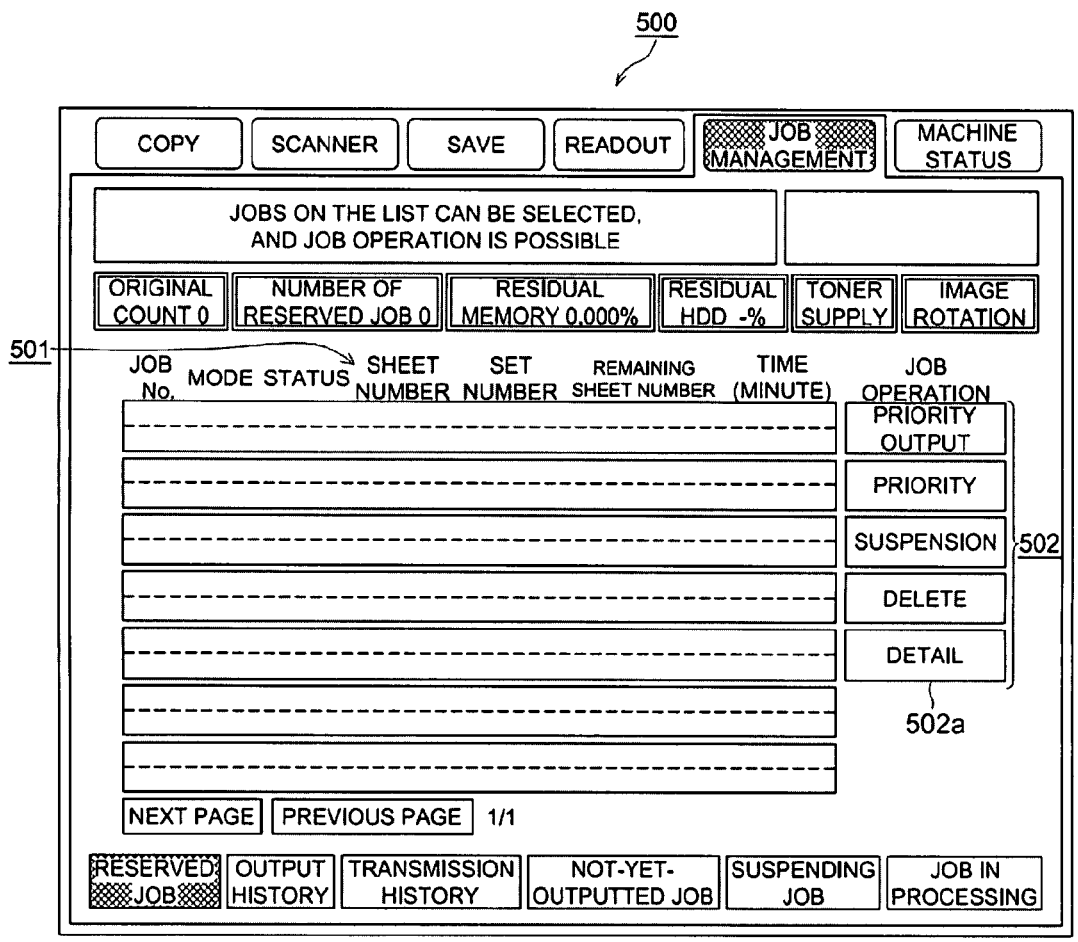
FIG. 8 is an explanatory drawing showing an example a conventional job manager screen in which the job list is displayed.

FIG. 7 shows the flow of the processes performed by the control CPU 21 that are related to the job list screen 60 display. When the control CPU 21 receives a display command for job list 70 from the user (for example when job list tag 48 is selected at the copy setting screen 40) (Yes in Step S201), job list 70 is created based on the job queue and job information stored in the non-volatile memory 28 and the job list screen 60 (A) with the non-selected status including this job list 70 is displayed in the operation display section 13 (Step S202).

When any of the jobs from the job list 70 that is shown on the job list screen 60(A) is selected by the user (Yes in Step S203), the job list screen 60(B) for the selected state for the job is displayed (Step S204, See FIG. 4). More specifically, the display operation button 65 which shows the setting content of the selected job Sj is displayed in the second region 62 and the selected job Sj is displayed in the job list 70 in a manner that is distinguishable from that of the other jobs, such as being displayed inversely.

When any of the display operation buttons 65 shown in the second region 62 displayed in the job list screen 60(B) with selected status is selected by the user (Yes in Step S205), jobs having the same setting content with respect to the setting items as the setting content corresponding to the display operation buttons 65 that have been selected for setting are extracted from the job display list 70, and the extracted jobs Rj (including the selected jobs Sj) are displayed in the job list 70 so as to be distinguishable from the other jobs.

Figure 6:
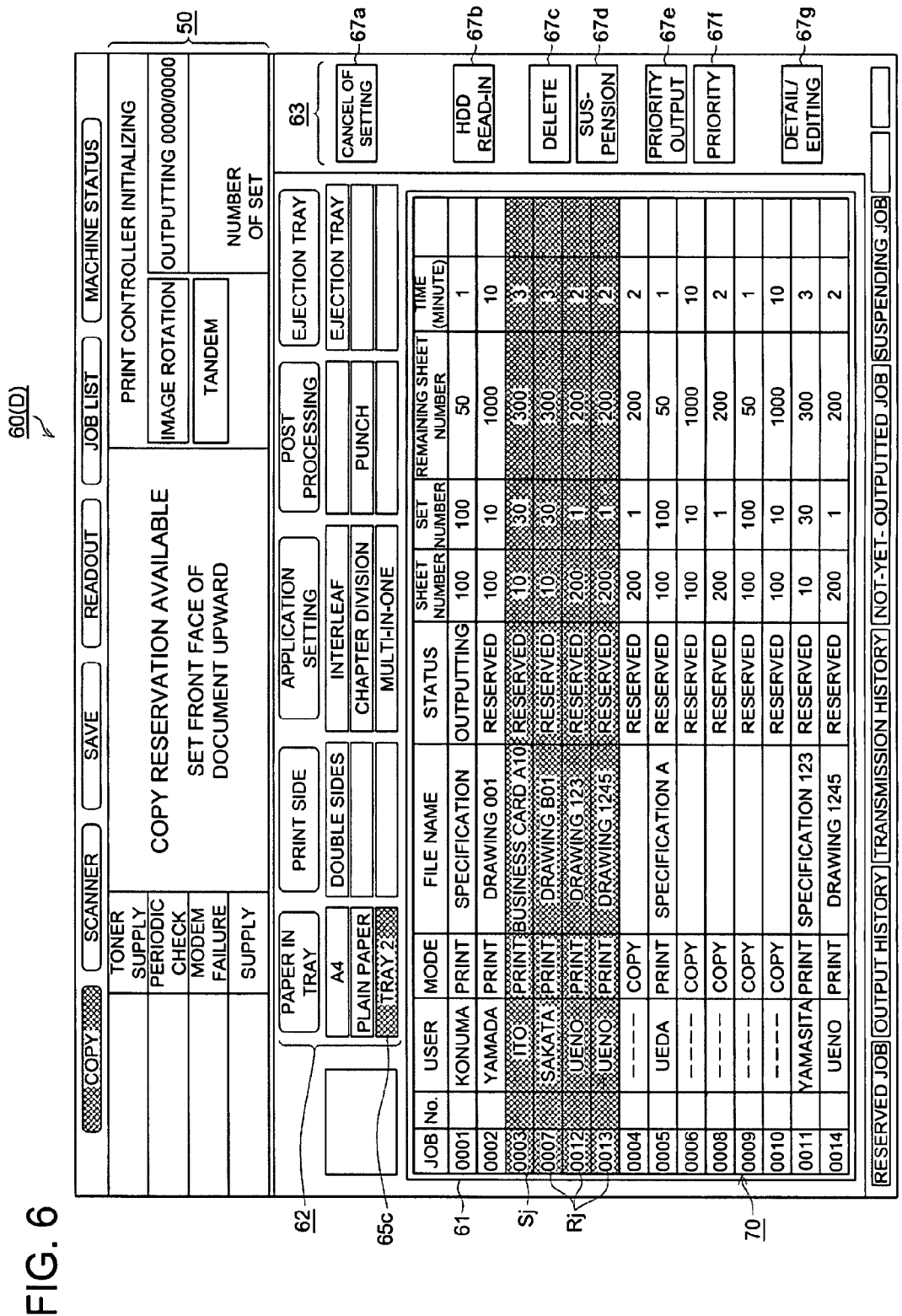
FIG. 6 is an explanatory diagram showing the job list screen in a state in which the extracted jobs are collected successively after the selected job.

In the state where the extracted job Rj is displayed so as to be distinguishable, when the user operates any of operation buttons 67 that are arranged in the third region 63 (Yes in Step 207), the control CPU 21 performs collective processing (operation) corresponding to that operation button 67 for the extracted job Rj or for the extracted job Rj and the selected job Sj (Step S208). FIG. 7 shows an example of the case where the priority output button 67e is operated (Yes in Step 207), and as shown in FIG. 6, the priority order of the extracted job Rj is raised so as to be collected successively next to the selected job Sj (Step S208).

It is to be noted that although this is not shown in FIG. 7, if any of the operation buttons 67 present in the third region 63 is operated in a state where job Sj is selected from the job list 70 and no extracted job Rj is extracted, the operation corresponding to the operation button is performed only for the selected job Sj whose setting content is displayed in the second region 62. This is also not shown in FIG. 7, but if the user selects another job from the job list 70 in a state where job Sj is selected from the job list 70 and no extracted job Rj is extracted, and this job becomes a newly selected job and the setting content for this job is displayed in the second region 62.

In this manner, in the image forming apparatus 10, the first region 61 and the second region 62 which never overlap with each other are provided on the job list screen 60, and the job list 70 is displayed in the first region 61, and job selection is accepted in the job list 70, and because the setting content of the selected job is displayed in the second region 62, the user can easily check the setting content for a specific job selected from the job list while the job list 70 remains displayed. As a result, there is no need to open a separate screen in order to check the setting content for a job and thus operation load for the user is reduced and the setting content for each job can be checked quickly.

Operations such as deletion, suspension, priority order changing and the like for the selected job Sj whose setting content is displayed in the second region 62 can be performed from the operation buttons 67 provided in the third region 63 that is on the same screen. As a result, the setting content for the jobs can be checked and the desired job can be found, and a series of operations such as deletion, suspension, changing priority order can be performed on the job list screen 60 without transferring to another screen and high operation efficiency and convenience can be ensured.

Furthermore, by selecting a display operation button 65 displayed in the second region 62, jobs having the same setting content with respect to the setting items as the setting content corresponding to the display operation buttons 65 are extracted from the job display list and displayed in a manner that is distinguishable from the other jobs. As a result, the operation load on the user for finding jobs with the same setting content is light compared to the case where the setting content for each job is sequentially displayed in the second region 62 and jobs with the same setting content are found individually.

In addition, the job extraction conditions can be changed depending on whether any of the display operation buttons 65 is operated and thus the degree of freedom for extraction is increased and it becomes possible for the user to extract jobs with the intended setting content. Furthermore, by selecting multiple display operation buttons 65, jobs may be extracted with AND conditions for multiple setting contents and thus the candidate jobs can be accurately narrowed down to the target jobs.

Also, operations (processes) such as deletion, suspension and priority order changing can be performed collectively for the extracted jobs Rj or the extracted jobs Rj and the selected jobs Sj and thus convenience is improved.

For example, if jobs Rj that have the same setting content for output paper as the selected job Sj are extracted and operations are conducted such that the priority order for these are collectively changed and selected job Sj and extracted jobs Rj are performed continuously, during the time that the selected job Sj and extracted jobs Rj are performed consecutively, there is no need to change the paper in the paper feeding tray to another type of paper, and thus the operation efficiency of the device is improved compared to the case where paper inside the sheet feed tray has to be changed when the job changes.

Furthermore, selection can be made individually for each extracted job Rj as to whether they will be subjected to the collective operation described above, and thus the jobs that will be subjected to collective operation can be selected more quickly and easily with a high degree of freedom and this can meet the various demands of users more flexibly.

An embodiment of the present invention was described above using drawings, but the specific structures are not limited to those shown in the embodiment, and changes and additions to the embodiment are included in this invention provided that they do not depart from the spirit of the invention.

For example, the screen configuration of the job list screen 60 shown in the embodiment is an example and the sizes and arrangements of the first region 61, the second region 62, and the third region 63 are not limited to those shown. These regions can have any configuration provided that they do not overlap with each other.

In addition, the items shown in the job list 70 and the items for setting shown in the second region 62 are not limited to those shown in the embodiment and may be suitably changed.

In the embodiment, in the case where collective operation for priority order is performed, extracted jobs Rj are collected successively next to the selected job Sj, however the manner for changing the priority order is not limited thereto. For example, there may be cases where one extracted job Rj has a higher priority order than the selected job Sj, and in these cases the job with the highest priority among the selected jobs Sj and extracted jobs Rj is put at the top, and the remaining selected jobs Sj and extracted jobs Rj are collected successively next to the highest priority job. In addition, the configuration may be such that priority order for selected jobs Sj and extracted jobs Rj that have been collected can be raised or lowered collectively.

In the embodiment, jobs having the same setting content, with respect to the setting items, as the setting content corresponding to the display operation buttons 65 that have been selected are searched and extracted, but the configuration may be such that jobs having the different setting content, with respect to the setting items, from the setting content corresponding to the display operation buttons 65 that have been selected are searched and extracted from the job list. Also in the embodiment, in the case where multiple display operation buttons 65 are selected, AND conditions for the setting conditions corresponding to those multiple display operation buttons are used as the search key when the jobs are extracted, but the configuration may be such that other search conditions such as AND, OR, NOT and the like can be used and furthermore the search conditions may be selected by the user.

For example, computing conditions such an AND button, OR button or NOT button may be arranged on the screen and when the first display operation button 65, the AND button, and the second operation button 65 are operated in that order, jobs are extracted using AND conditions as the search key in which jobs having a setting content that is the same as the setting content indicated by the first operation button 65 and also same as the setting content indicated by the second operation button 65. Also, the configuration may be such that when the first display operation button 65, the AND button, the NOT button and the second operation button 65 are operated in that order, jobs which have setting content indicated by the first operation button 65 and do not have setting content indicated by the second operation button 65 are extracted.

According to the image forming apparatus of this invention, since a job list and setting content for jobs selected from this job list are concurrently displayed so as to be arranged in separate regions that do not overlap on the same screen, there is no need to open a separate screen in order to check the setting content of the selected job from the job list. As a result, the setting content of each job can be quickly checked and the operational load on the user can be reduced.

In addition, when the setting content of the selected job is used as a search key for extracting jobs from the job list and the job list is displayed so that the extracted jobs are distinguishable from the other jobs, the jobs which have the target setting content can be recognized without checking the setting content for each job individually.

Furthermore, in cases where collective operations can be performed for the extracted jobs, the workload for the same operations performed for multiple jobs that have the same setting content is reduced and thus convenience is improved.

What is claimed is:

1. An image forming apparatus which executes jobs to form images on an output paper, comprising;
    a job memory section which stores job information indicating setting contents of the jobs, each of the setting contents including at least one of an output paper size and an output paper type;
    a display section which has both a first region and a second region in a single screen, the first and the second regions never overlapping with each other; and
    a control section which controls contents to be displayed on the display section,
    wherein, the control section controls to
        display a job list in the first region in the single screen based on the job information stored in the job memory section, and also in parallel with displaying the job list,
        display, in the second region in the single screen, each of the setting contents of a job selected from the job list displayed in the first region, wherein a function of an operation button is given to each of the displayed setting contents of the selected job in the second region,
        find, in cases where the operation button is selected, by utilizing the setting content of the selected job corresponding to the selected operation button as a search key, a matching job including a setting content of at least one of an output paper size and an output paper type respectively matching the output paper size or the output paper type of the setting content corresponding to the selected operation button, and
        extract the matching job from the job list displayed in the first region, wherein the job list is displayed in such a configuration that the extracted matching job can be distinguished from one or more other jobs in the job list.

2. The image forming apparatus of claim 1, wherein selections of multiple operation buttons are possible, and when multiple operation buttons are selected, the matching job is extracted by using AND conditions of the setting content corresponding to each of the multiple selected operation buttons, as the search key.

3. The image forming apparatus of claim 1, wherein in a condition that the job list is displayed in such a configuration that the extracted matching job and the other job can be distinguished, when an operation button for a prescribed operation to a job is selected, the prescribed operation is collectively executed for all extracted matching jobs.

4. The image forming apparatus of claim 3, wherein an operation to remove the extracted matching job individually from subjects of the prescribed operation is accepted.

5. The image forming apparatus of claim 3, wherein the prescribed operation is an operation to change a priority order of the extracted matching job.

6. The image forming apparatus of claim 3, wherein the prescribed operation is an operation to delete the extracted matching job.

7. The image forming apparatus of claim 3, wherein the prescribed operation is an operation to make the extracted matching job in a state of suspension.

* * * * *